Nov. 8, 1955 R. M. LACEY 2,722,857
JAR SEAL REMOVING DEVICE
Filed Sept. 29, 1953
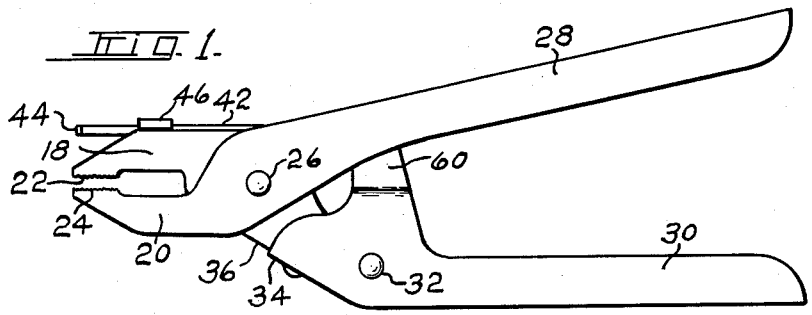
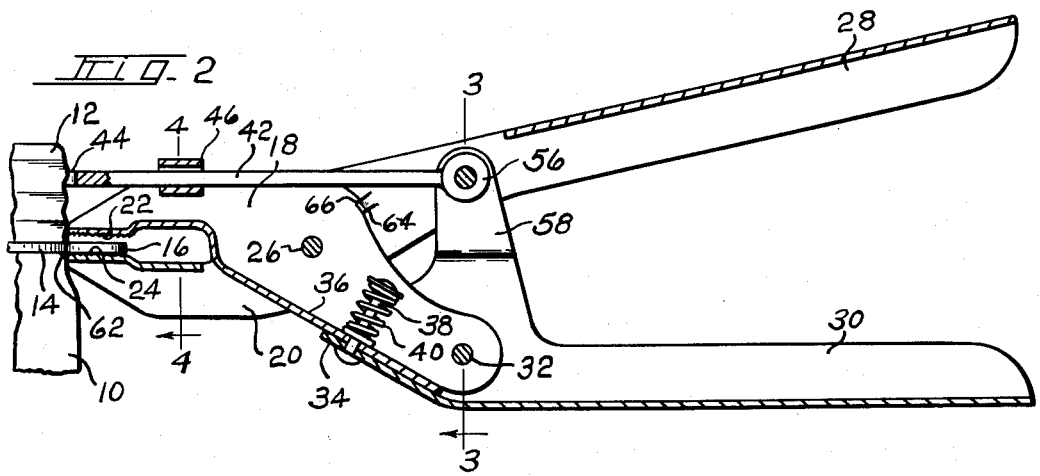
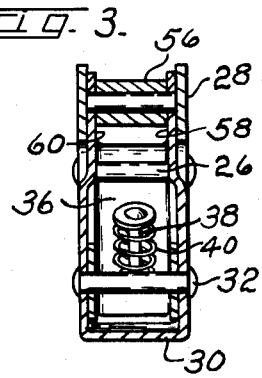
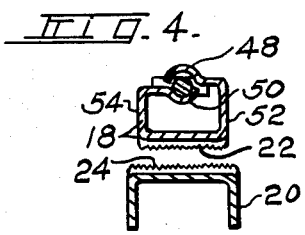
INVENTOR
RAYMOND M. LACEY
BY
ATTORNEY

2,722,857
JAR SEAL REMOVING DEVICE

Raymond M. Lacey, Rochester, N. Y.

Application September 29, 1953, Serial No. 382,939

5 Claims. (Cl. 81—5.1)

This invention relates to a gripping device for jar seals, together with thrust means for exerting a radial pull on the seal for releasing the seal.

In fruit jars and cans employed for canning and the like, there is employed a rubber seal between an annular shoulder on the jar and the screw cap or other cover. Such seal is initially squeezed and sealed between the cap and shoulder, and the canning process creates a vacuum within the jar, adding to the pressure of the cap upon the seal. The grip between the cap and jar upon the seal ring is such as to render it difficult to remove the seal or the cap.

The present invention is directed to a jaw device for gripping the exposed edge or tab of such a seal, and thereafter exerting a radial thrust to stretch and distort the seal, and thus allow the entrance of air into the jar, following which the remainder of the seal is loosened and the cap becomes removable.

It is an object of the invention to provide a unitary tool for gripping such seals and exerting a radial thrust thereupon, to pull said seal from its position of compression between the cap and jar. The invention is further directed to a relatively simple construction of a device for performing the operations set forth, and which device is rugged, economical to manufacture, and of relatively few parts and positive in action.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of the seal tab gripping device;

Figure 2 is an enlarged longitudinal sectional view through the device;

Figure 3 is a sectional view taken substantially on the line 3—3 of Figure 2; and Figure 4 is a sectional view taken substantially on the line 4—4 of Figure 2.

Referring particularly to Figures 1 and 2, there is shown a typical fruit jar 10 having a screw cap 12, the lower edge of such cap bearing upon the well-known flat rubber washer or seal 14 having a tab 16. As is well understood, vacuum within the jar operates to hold the cap firmly against the seal. The invention contemplates a device for gripping the seal tab, and adapted to apply a pull thereto to break the seal and relieve the vacuum within the jar. The device comprises a pair of jaws 18 and 20, having knurled teeth 22 and 24 on the opposing faces adapted to grip the seal tab 16. Both jaws are pivoted together as at 26, and the jaw 20 is extended to form an end gripping handle 28. The jaw 18 is also extended in an articulate manner, there being provided a separate handle member 30 pivoted to the jaw 18 as at 32. The handle 30 is of channel section, and embraces the channel section of the jaw 18, there being provided an extending portion 34 of the handle 30, adapted to lie against and engage the web portion 36 of the jaw 18.

A tension member 38 extending through the extending portion 34 of the handle 30 and the web 36 of the jaw 18, is provided with a heavy compression spring 40 to normally retain the handle 30 in respect to the jaw 18 in the position shown in Figure 2. Located above the teeth 22 and 24 is a thrust member 42 having a cap-engaging arcuate end 44, such thrust member being guided in the guideway 46 formed by arcuate overlying members 48 and 50 integrally extended from the side flanges 52 and 54 of the jaw 18. The thrust member is pivotally connected by an eye 56 to arms 58 and 60 extending from the side flanges of the handle member 30. Such arms 58 in effect form a bell crank with the handle 30, such crank pivoting on the pivot 32.

It will be seen that when the handles 28 and 30 are moved together, the teeth 22 and 24 initially grip the tab 16. When a substantial grip sufficient to pull the tab has been effected, the handle 30 may be pivoted with respect to the jaw 18 by the yielding of the compression spring 40, whereby to apply a thrust to the thrust member 42, causing such member to engage the cap 12 of the fruit jar. Continued compression between the handles 28 and 30 will effect a more secure grip upon the tab 16, and at the same time exert a direct radial pull on the tab 16, causing the seal to be drawn from its clamped position between the cap 12 and the shoulder 62 of the jar 10. It will be appreciated that seals of the type referred to are generally composed of rubber, and that upon slight stretching, tend to distort, and upon a pull being exerted upon the tab 16, such seal will tend to be stretched, causing the same to reduce elastically in thickness, whereupon the seal between the cap and jaw will be broken in the region of the tab and the vacuum within the jar released. Thus, the slight pull upon the tab 16 by the action of the thrust bar 42 against the cap 12 will break the seal and quickly release the jar rubber from beneath the cap, and thus facilitate removal of the cap from the jar with dispatch.

The jaw 20 is provided with a stuck-in lug 64 which engages a shoulder 66 in jaw 18, to limit the opening movement of the jaws to an amount sufficient to readily embrace the seal tab, and thus retain the device in readiness for quick application and gripping of the tab.

It will be seen that the spring 40 is preferably precompressed and holds the grip portion and jaw rigid as a lever until more than sufficient pressure is applied to the jaws to securely grip the seal tab. Thereafter, the spring yields to permit the operation of the thrust member. The device provides a positive means for effecting a direct pull on the tab, such pull being least likely to tear the tab or otherwise injure the seal. The broad face of the jaws provides a grip over a substantial area.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A device for removing the cover seal from a container, comprising a pair of crossed levers, pivoted together intermediate their ends, said levers having seal-engaging jaws at one end and hand grips at the other, one of said hand grips being a pivotal extension of one of said levers a thrust member carried by said one of said levers and having an end adjacent said jaws adapted to engage a container cover adjacent said seal, and means connected with said thrust member and said pivotal extension, responsive to the degree of pressure applied between said hand grips for moving the end of said thrust member beyond the end of said seal-engaging jaws.

2. A device for removing the cover seal from a container, comprising a pair of crossed levers, pivoted together intermediate their ends, said levers having seal-engaging jaws at one end and hand grips at the other, a thrust member slidably carried by one of said levers and having an end adjacent said jaws adapted to engage a container cover adjacent said seal, and means associated with one of said levers and said thrust member responsive to the degree of pressure applied between said hand grips for moving the end of said thrust member beyond the end of said seal-engaging jaws, said means comprising a pivotal connection between the hand grip of said one lever and the remainder thereof, and resilient means for holding said hand grip and remainder rigid until the degree of pressure exceeds a predetermined amount.

3. A device for removing the cover seal from a container, comprising a pair of crossed levers, pivoted together intermediate their ends, said levers having seal-engaging jaws at one end and hand grips at the other, a thrust member slidably carried by one of said levers and having an end adjacent said jaws adapted to engage a container cover adjacent said seal, and means associated with one of said levers and said thrust member responsive to the degree of pressure applied between said hand grips for moving the end of said thrust member beyond the end of said seal-engaging jaws, said means comprising a pivotal connection between the hand grip of said one lever and the remainder thereof, and resilient means for holding said hand grip and remainder rigid until the degree of pressure exceeds a predetermined amount, said hand grip having an extension forming a bell crank connected to said thrust member.

4. A device for removing the cover seal from a container, comprising a pair of gripping levers having seal-gripping jaws at one end and operating hand grips at the other, pivotal means for pivoting said levers together intermediate their length, and one of said levers being articulate, and having the hand grip section thereof pivotally connected to the remainder thereof, at a point spaced from said pivotal means, means for yieldingly preventing pivotal movement between the hand grip section and the remainder of said articulate lever, and thrust means adapted to engage a container cover adjacent said jaws mounted on one of said levers for movement in a plane substantially parallel with said jaws and transverse of the axis of said pivotal means, and means connecting said hand grip section with said thrust means for actuating said thrust means upon pivotal movement of said hand grip section relative to the remainder of said articulate lever.

5. A device for removing the cover seal from a container, comprising a pair of gripping levers having seal-gripping jaws at one end and operating hand grips at the other, pivotal means for pivoting said levers together intermediate their length, and one of said levers being articulate, and having the hand grip section thereof pivotally connected to the remainder thereof, at a point spaced from said pivotal means, means for yieldingly preventing pivotal movement between the hand grip section and the remainder of said articulate lever, and thrust means adapted to engage a container cover adjacent said jaws mounted on one of said levers for movement in a plane substantially parallel with said jaws and transverse of the axis of said pivotal means, and bell crank extension means formed integral with said hand grip section having an arm connected with said thrust means for actuating said thrust means upon pivotal movement of said hand grip section relative to the remainder of said articulate lever.

References Cited in the file of this patent

UNITED STATES PATENTS

| | | |
|---|---|---|
| 636,147 | Judy | Oct. 31, 1899 |
| 1,620,706 | Welsh | Mar. 15, 1927 |
| 1,638,616 | Burke | Aug. 9, 1927 |
| 1,810,315 | Kaser | June 16, 1931 |
| 2,020,052 | Fischer | Nov. 5, 1935 |
| 2,486,851 | Jennings | Nov. 1, 1949 |
| 2,578,985 | Schmidt | Dec. 18, 1951 |

FOREIGN PATENTS

| | | |
|---|---|---|
| 812,288 | Germany | Aug. 27, 1951 |
| 813,653 | Germany | Sept. 17, 1951 |